United States Patent
König et al.

[11] 3,725,380
[45] Apr. 3, 1973

[54] METHOD OF SYNTHESIZING PEPTIDES IN THE PRESENCE OF A CARBODIIMIDE AND A 1-HYDROXY-BENZOTRIAZOLE

[75] Inventors: Wolfgang König, Langenhain/Taunus; Rolf Geiger, Frankfurt/Main, both of Germany

[73] Assignee: Farbwerke Hoechst Aktiengesellschaft vormals Meister, Lucius & Bruning, Frankfurt am Main, Germany

[22] Filed: Apr. 1, 1970

[21] Appl. No.: 24,844

[30] Foreign Application Priority Data

Apr. 5, 1969 Germany....................P 19 17 690.0
July 24, 1969 Germany....................P 19 36 656.8

[52] U.S. Cl..............................260/112.5, 260/308
[51] Int. Cl............................................C07c 103/52
[58] Field of Search....................................260/112.5

[56] References Cited

UNITED STATES PATENTS 3,317,559  5/1967  Anderson..........................260/326.3
3,396,157  8/1968  Young et al........................260/112.5
3,121,707  2/1964  Anderson et al...................260/112.5

FOREIGN PATENTS OR APPLICATIONS 1,073,500  1/1960  Germany..........................260/112.5

OTHER PUBLICATIONS

Anderson et al., Actu. Chem. Acad. Sci. Hung 44, 51–59 (1965).
Zimmerman et al., J. Amer. Chem. Soc. 89, 7,151–7,152 (1967).
Paquette, J. Am. Chem. Soc. 87, 5,186–5,190 (1965).
Singh et al., J. Org. Chem. 25, 657–658 (1960).
Konig et al., Chem. Ber. 103, 788–798 (1970).

*Primary Examiner*—Elbert L. Roberts
*Attorney*—Curtis, Morris & Safford

[57] ABSTRACT

Improved synthesis of peptides by the carbodiimide method in which an amino-protected amino acid or peptide having a reactive carboxy group is condensed with a carboxy-protected amino acid or peptide having a reactive amino group in the presence of a 1-hydroxy-benzotriazole or a substituted 1-hydroxy-benzotriazole of the formula

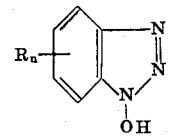

as well as in the presence of a carbodiimide such as dicyclohexyl carbodiimide.

5 Claims, No Drawings

METHOD OF SYNTHESIZING PEPTIDES IN THE PRESENCE OF A CARBODIIMIDE AND A 1-HYDROXY-BENZOTRIAZOLE

The present invention relates to a method for synthesizing peptides in the presence of a carbodiimide and a 1-hydroxy-benzotriazole.

One of the easiest process for the preparation of peptides consists in linking a N-acyl-amino acid or a N-acyl-peptide with an amino acid ester or peptide ester by means of dicyclohexyl-carbodiimide [J. C. Sheehan and G. P. Hess, J. Am. Chem. Soc. 77, 1,067 (1955)]. This method has the disadvantage of a quite considerable racemization in the linking of the peptides [F. Weygand, A. Prox and W. König, Chem. Ber. 99, 1,451–1,460 (1966)] and the formation of N-acyl-ureas, which make the product of the synthesis impure and reduce the yield. (Cf. E. Schröder and K. Lübke, The Peptides, Vol. I., pages 108 – 111, Academic Press, New York and London 1965).

Additions of 1.1 to 2 equivalents of N-hydroxy-succinimide during peptide synthesis with dicyclohexyl-carbodiimide reduce the racemization to below 1 percent of D-compound and prevent the formation of N-acyl-ureas [F. Weygand, D. Hoffmann, E. Wünsch, Z. Naturf. 21 b, 426–428 (1966); J. E. Zimmermann and G. W. Anderson, J. Am. Chem. Soc. 89, 7,151 (1967)]. The addition of N-hydroxy-succinimide in the dicyclohexyl-carbodiimide method, however, has serious disadvantages. It is reported in Acta Chim. Hung. 44, 63–65 (1965) that N-hydroxy-succinimide itself reacts with dicyclohexyl-carbodiimide and that sterically hindered N-acyl-peptide-N-hydroxy-succinimide esters could not be prepared. A compound formed from one mol of dicyclohexyl-carbodiimide with three mols of N-hydroxy-succinimide was later on identified as succinimidooxycarbonyl-β-alanine-hydroxy-succinimide ester (E. Bricas: Peptides, North Holland Publishing Comp. (1968), pages 156 – 157).

This compound reacts smoothly with amines to yield urea-derivatives of the β-alanine-amides [cf. also Z. Naturf. 23 b, 1,391 (1968)]. After reaction of BOC-L-glutamic acid-α-benzyl ester with N-hydroxy-succinimide and dicyclohexyl-carbodiimide and following addition of 2,4,6-trimethoxy-benzylamine, a considerable amount of succinimido-oxycarbonyl-β-alanine-2,4,6-trimethoxy-benzylamide was isolated.

Now, we have found that, surprisingly, in the dicyclohexyl-carbodiimide method the addition of 1-hydroxy-benzo-triazoles (HOT) can also reduce racemization in the racemization test according to Chem. Ber. 99, 1,451–1,460 (1966), to below 1 percent of D-compound and prevents N-acyl-urea formation (cf. Table 1 in Example I, 1). In addition thereto, no byproducts can be formed, as those which can be formed upon addition of N-hydroxy-succinimide. The melting points and yields indicated in Table 3 show that in the peptide synthesis with DDC the 1-hydroxy-benzotriazoles are distinctly superior to known addition of N-hydroxy-succinimide (tests 26 – 29).

Hence, the object of the present invention is a process for the manufacture of peptides wherein a protected amino-acid or a protected peptide, in which the carboxyl group which shall enter into reaction is free, is reacted with a protected amino-acid or peptide ester or amide, in which the amino group which shall enter into reaction is free, in one of the solvents usual in peptide chemistry with the addition of a carbodiimide and of 1 – 2 equivalents of a 1-hydroxy-benzotriazole of the general formula I

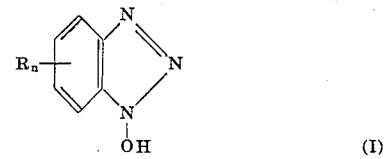

in which R represents halogen, trifluoromethyl, nitro, sulfonic acid amide, carboxamide, cyano, lower alkyl and/or methoxy or ethoxy groups, and $n$ is 0 or an integer from 1 to 4. Alternatively, a protected amino-acid or a protected peptide, in which the carboxyl group which shall enter into reaction is free, is reacted with 1 – 2 equivalents, preferably with 1 equivalent, of a 1-hydroxy-benzotriazole of the formula I and a carbodiimide to obtain an activated derivative. The resulting product is allowed to react subsequently with an amino-acid that may be protected or a peptide that may be protected or with the amides thereof, the amino group of said components being free, in one of the solvents usually employed in peptide chemistry. After the reaction is complete and the product is purified, the protective groups are split off completely or partially, if desired or required.

If $n > 1$, R may also stand for different substituents.

From N-protected amino-acids and peptides, there can be prepared with 1-hydroxy-benzotriazoles and dicyclohexyl-carbodiimide activated products which are excellently suitable for peptide synthesis. Thereby, "activated esters" are formed which, in solution, stand in an equilibrium with an "activated amide". Depending on the substance, either the activated ester or the activated amide can be isolated. In general, however, isolation of the activated product is not necessary.

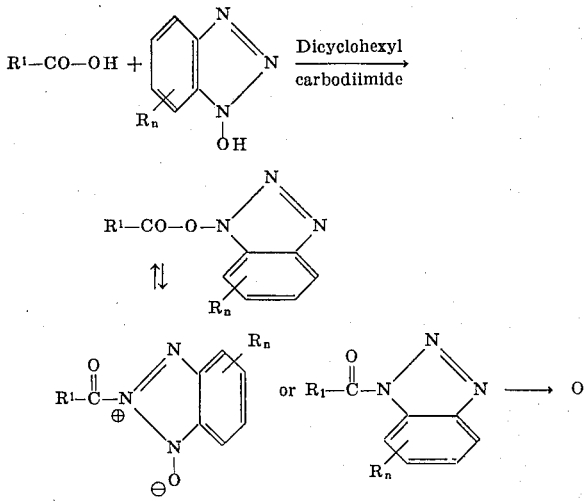

R¹COOH stands for N-protected amino-acids and N-protected peptides.

These new activated compounds react very rapidly with primary and secondary amines. In the synthesis of Z-Phe-Val-OCH₃ from Z-Phe-OBT and H-Val-OCH₃·HCl with the addition of 1 equivalent of N-ethyl-morpholine, more than 90 percent of peptide are formed after only 5 minutes at 0° C (cf. the accompanying drawing and Example IV, 4). In the method using N-hydroxy-succinimide ester, the 90 percent stage is reached only after 2 hours at 0° C. A further advantage is that the esters need not be isolated, because 1-hydroxy-benzotriazole and its derivatives do not form by-products with dicyclohexyl-carbodiimide, in contradistinction to N-hydroxy-succinimide. This can be proved very easily by paper chromatography, for example on a partially protected corticotropin-(11–23)-tridecapeptide-amide having a free α-amino group, described in Chem. Ber. 97, 1,207 (1964). If this compound is stored with dicyclohexyl-carbodiimide and hydroxy-succinimide in dimethylformamide or a similar solvent, it can after some hours no longer be detected by chromatography because it has reacted to form other compounds. With dicyclohexyl-carbodiimide and 1-hydroxy-succinimide, the trideca-peptide was unchanged even after 15 hours.

In the activation of N-protected peptides which do not contain proline and glycine as the amino-acid at the carboxylic end group, a slight racemization is to be expected. But even N-hydroxy-succinimide esters cannot be prepared completely free of racemization with dicyclohexyl-carbodiimide (cf. Table 2, Example I, 2). In addition to 1-hydroxy-benzotriazole itself, the following derivatives may also be used: 6-chloro-1-hydroxy-5-isopropyl-benzotriazole, or 5-chloro-1-hydroxy-7-methyl-6-nitro-benzotriazole, as well as the compounds mentioned in the examples.

As carbodiimides, the compounds usually employed in peptide chemistry, such as N,N'-dicyclohexyl-carbodiimide, N,N'-di-isopropyl-carbodiimide and water-soluble carbo-diimides, may be used. As protective groups for the functional groups of the amino-acids and peptides which have to be protected, all the protective groups usually employed in peptide chemistry are suitable. Even polymeric resins, for example hydroxymethyl-polystyrene, may be used as protective groups [E. Schröder, K. Lübke, The Peptides, Vol. I, pages 108–111, Academic Press, New York and London (1965)].

For preparing the 1-hydroxy-benzotriazoles substituted at the nucleus which are used according to the invention and which have not yet been described in the literature, o-chloro-nitrobenzenes of the general formula II, in which R and $n$ have the meanings given above, are heated with 3 equivalents of hydrazine-hydrate or with 1 equivalent of hydrazine-hydrate and 2 equivalents of triethylamine in alcohol and the hydrazine- and triethylamine-salt, respectively, of the 1-hydroxy-benzotriazole which is formed is dissolved in water and acidified, whereupon the clearly substituted 1-hydroxy-benzotriazole precipitates.

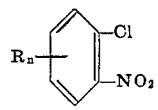

(2)

Suitable solvents which are commonly used in peptide chemistry are, for example dimethylformamide, dimethylacetamide, tetrahydrofurane, dioxane, pyridine, dimethyl sulfoxide or methylene chloride. The reaction temperature is advantageously in the range between −20° and +40° C, preferably at about 0° C.

In the case of carboxyl-protected peptides which are sparingly soluble in water, the 1-hydroxy-benzotriazole added can be completely extracted by shaking with sodium- or potassium-bicarbonate solution or with a soda solution. A particular advantage of this method is that the 1-hydroxy-benzotriazole used can be again precipitated by acidification of these sodium bicarbonate washing solutions. This is not possible if N-hydroxy-succinimide is added, for example, since this compound also dissolves in acid solutions. 1-hydroxy-benzotriazole can be extracted from sparingly-soluble peptides with isopropanol, alcohol, methanol, tetrahydrofurane or hot water.

In all the examples tested, the yield obtained with the addition of 1-hydroxy-benzotriazoles was higher than with or without addition of N-hydroxy-succinimide; for example, a protected decapeptide having the sequence of the antamanide, a cyclodecapeptide from Amanita phalloides, could be prepared according to the dicyclohexyl-carbodiimide method from Z-Phe-Phe-Pro-Pro-OH and H-Phe-Phe-Val-Pro-Pro-Ala-OBu$^t$ with the addition of 1-hydroxy-benzotriazole in a yield of 91.4 percent. Upon a corresponding addition of N-hydroxy-succinimide, a yield of only 61 percent was obtained.

The new method is also successful in the preparation of corticotropin-(1–23)-tricosapeptide-amide as described in German Patent No. 1,240,088. There, 4-nitrophenol is added to the dicyclohexyl-carbodiimide. However, pentachlorophenol or hydroxyl-succinimide are better than this additive. When taking the yields obtained with the latter additives as 100, then the yield without addition is 60, with nitrophenol it is 80, but with 1-hydroxy-benzotriazole it is 140, as has been found by biological assay and by a method of quantitative determination using photometric evaluation of the color of the ninhydrine-cadmium complex after paper chromatographic separation of the crude product in a manner analogous to the process described in Naturwiss. 42, 416 (1955).

Table 1 shows that racemization in the dicyclohexyl-carbodiimide method in tetrahydrofurane as the solvent is reduced to below 1 percent if 2 equivalents of 1-hydroxy-benzotriazole are added. If dimethylformamide is used as the solvent, a slight racemization takes place upon addition of 2 equivalents of unsubstituted 1-hydroxybenzotriazole, while with an addition of 1 – 1.2 equivalent racemization remains below 1 percent. It is quite the reverse if N-hydroxy-succinimide is used as an additive. If a peptide is activated by means of dicyclohexyl-carbodiimide and 1-hydroxy-benzotriazole, the degree of racemization is the lowest even here with 1 equivalent of 1-hydroxy-benzotriazole. In tetrahydrofurane, it even remains below 1 percent. If N-hydroxy-succinimide is added, the course is here again reversed (cf. Table 2). As is shown in Examples III 2 and 3 (synthesis of BOC-GlN(Bz)-OBz), the yields are smaller when 2 equivalents of N-hydroxy-succinimide are added rather than 1 equivalent, and the reaction products are considerably less pure. This means that the low degree of racemization upon addition of N-hydroxy-succinimide is purchased with the formation of many by-products. If, however, peptides are synthesized according to the "one-pot" method by reaction of the carboxyl component with the amino component by means of a carbodiimide with addition of a 1-hydroxy-benzotriazole of the general formula I, it is suitable to use 2 equivalents of the corresponding 1-hydroxy-benzotriazole of the general formula I.

In some cases the new activated esters were isolated. Serine peptides can be prepared with excellent yields according to the one-pot method. For example, the Z-Ser.Gly-ONB could be prepared in a yield of 97.5 percent according to the dicyclohexyl-carbodiimide method with addition of 2 equivalents of 1-hydroxy-benzotriazole. Without the addition of 1-hydroxy-benzotriazole, the yield was only 70 percent [Helv. Chim. Acta 42, 1,702 (1959)].

Accordingly, the new process has great importance for the manufacture of serine peptides because the azide method used generally gives lower yields. Moreover, 4-carbobenzoxy-aminoxazolidinone-2 is formed as a byproduct from N-carbobenzoxy-serine azide by way of the isocyanate. If dicyclohexyl-carbodiimide is used alone, N-acyl-urea is formed as byproduct [E. Schröder and K. Lübke, The Peptides, Vol. I, page 208, Academic Press, New York and London (1965)].

If glutaminyl- or asparaginyl-peptides are prepared with the aid of dicyclohexyl-carbodiimide, corresponding nitriles are formed in considerable amounts by dehydration of the acid amide group. With N-acyl-asparagin, an imide formation is also possible. Thus, asparaginyl-peptides can only be prepared with yields of 39 – 45 percent [E. Schröder and K. Lübke, The Peptides, Vol. I, pages 191, 202–204, Academic Press, New York and London, (1965)]. When, however, 1-hydroxy-benzotriazole is added in the dicyclohexyl-carbodiimide method, glutaminyl- and asparaginyl-peptides can be prepared with good yields and high purity and in a rapid manner. For example, Z-AsN-Leu-OCH$_3$ was prepared according to the new method in a yield of 85 percent and Z-GlN-Ala-OBu$^5$ was obtained in a yield of 73.7 percent.

Arginine peptides having a protonized guanido group can also be prepared according to the new method with better yield and in pure form. Even the preparation of the activated ester from protonized N-acylarginine and 1-hydroxy-benzotriazole is possible, which ester is further reacted without isolation.

As components of the peptides prepared according to the process of the invention, there may be used all the amino-acids in their L- or D-form contained in naturally occurring peptides. β-Amino-acids, for example β-alanine or other, only synthetically or semi-synthetically accessible amino-acids, for example α-methyl-alanine, α-methyl-3,4-dioxy-L-phenyl-alanine or β-chloroalanine, may also be used.

After splitting off the protective groups, the products of the invention may be used as medicaments or as intermediate products in the manufacture of other therapeutically valuable peptides, such, for example, as oxytocin, vasopressin, glucagon, ACTH, secretin, thyrocalcitonin, or insulin.

In the present specification and in the examples, the amino-acids are abbreviated in accordance with the internationally accepted rules. In addition, the following abbreviations are used:

AsN   asparagine
GlN   glutamine
Z   carbobenzoxy-
Boc   tert.-butyloxycarbonyl
NPS   o-nitrophenyl-sulfenyl-
OCH$_3$   methyl ester
ONB   p-nitrobenzyl ester
OBu$^t$   tert.-butyl ester
ONp   4-nitrophenyl ester
OSu   N-hydroxy succinimide-ester
OTCP   trichloro-phenyl ester
OBT   1-oxy-1,2,3-benzotriazole ester
Mbh   4,4'-dimethoxy-benzhydryl-
Mmb   α,α-dimethyl-4-methoxy-benzyl-
DMF   dimethylformamide
CHA   cyclohexylamine
DCHA   dicyclohexylamine
DCC   dicyclohexyl-carbodiimide
TC   Thin-layer chromatography
OBz   benzyl ester
THF   tetrahydrofurane
Bz   benzyl-
DMA   dimethyl-acetamide All the amino-acids mentioned hereafter are used in their L-form.

The following examples illustrate the invention

EXAMPLES

I. Gas-chromatographic racemization test according to F. Weygand et al. [Chem. Ber. 99, 1,451–1,460 (1966)] The test was modified in that instead of Z-Leu-Phe-OH, BOC-Leu-Phe-OH was used, which has the advantage that the completely protected peptide BOC-Leu-L.D-Phe-Val-OBu$^t$ which is formed can be hydrolyzed without previous cleavage of the protective groups.

1. Test for racemization in the dicyclohexyl-carbodiimide method with different additives 378.5 mg of BOC-Leu-Phe-OH (1 millimol) and 209.7 mg of H-Val-OBu$^t$ · HCl (1 millimol) were dissolved in 2 ml of absolute dimethylformamide or tetrahydrofurane. 0.12 ml of N-ethyl-morpholine (1 millimol) was added and the whole was cooled in an ice bath. Then, the additives were added and finally a solution that had been cooled to 0° C of 207 mg of DCC (1 millimol) in 1 ml of absolute dimethylformamide or tetrahydrofurane. The batches were allowed to stand for 5 hours at 0° C and for about 15 hours at room temperature, then diluted with about 30 ml of ethyl acetate. The precipitate that separated was filtered off, the filtrate was shaken with saturated sodium bicarbonate solution, 2N citric acid, saturated sodium bicarbonate solution and water, dried with sodium sulfate, and concentrated. The residue was chromatographed in ethyl acetate over 3 g of basic aluminum oxide (Woelm, activity degree I). The eluate (about 40 ml) was concentrated and the residue was dissolved in about 5 ml of 8 – 9 N-methanolic hydrochloric acid and heated for 24 hours to 70° C in a bomb tube. The methanolic hydrochloric acid was concentrated and the further treatment was effected as described by F. Weygand et al.

The results are indicated in following Table 1.

Table 1

Racemization tests in the dicyclohexyl-carbodiimide method with different additives

| Equivalent | Additive | Solutions | % D-Phe-L-Val |
|---|---|---|---|
| 0 | none | DMF | 14.3 |
| 0 | none | THF | 8.1 |
| 2 | penta-chlorophenol | DMF | 27.0 |
| 2 | penta-chlorophenol | THF | 10.0 |
| 1 | N-hydroxy-succinimide | DNF | 1.0 |
| 1.2 | N-hydroxy-succinimide | DMF | <1.0 |
| 2 | N-hydroxy-succinimide | DMF | <1.0 |

| Equivalent | Additive | Solvent | % |
|---|---|---|---|
| 2 | N-hydroxy-succinimide | THF | <1.0 |
| 1 | 1-hydroxybenzotriazole | DMF | <1.0 |
| 1.2 | 1-hydroxybenzotriazole | DMF | <1.0 |
| 2 | 1-hydroxybenzotriazole | DMF | 1.7 |
| 2 | 1-hydroxybenzotriazole | THF | <1.0 |
| 2 | 1-hydroxy-6-nitro-benzotriazole | DMF | <1.0 |
| 1 | 1-hydroxy-6-nitro-benzotriazole | DMF | <1.0 |
| 2 | 5-chloro-1-hydroxy-benzotriazole | DMF | 1.7 |
| 1 | 5-chloro-1-hydroxy-benzotriazole | DMF | <1.0 |
| 2 | 6-chloro-1-hydroxy-benzotriazole | DMF | 1.1 |
| 1 | 6-chloro-1-hydroxy-benzotriazole | DMF | <1.0 |
| 2 | 5,6-dichloro-1-hydroxy-benzotriazole | DMF | 1.3 |
| 1 | " | DMF | <1.0 |
| 2 | 6-bromo-1-hydroxy-benzotriazole | DMF | <1.0 |
| 1 | " | DMF | <1.0 |
| 2 | 1-hydroxy-6-trifluoromethyl-benzotriazole | DMF | <1.0 |
| 2 | 1-hydroxy-6-benzotriazole sulfonamide | DMF | <1.0 |
| 1 | 1-hydroxy-6-benzotriazole-sulfonamide | DMF | <1.0 |
| 1 | 1-hydroxy-6-benzotriazole-sulfonicacid diethyl amide | DMF | <1.5 |
| 2 | " | DMF | <1.0 |
| 1 | 1-hydroxy-6-benzotriazole-sulfonicacid methyl amide | DMF | <1.0 |
| 2 | " | DMF | <1.0 |
| 2 | 1-hydroxy-6-benzotriazole-carboxamide | DMF | <1.0 |
| 1 | " | DMF | <1.0 |
| 2 | 1-hydroxy-6-methyl-benzotriazole | DMF | <1.0 |
| 1 | " | DMF | <1.0 |
| 2 | 1-hydroxy-5-methyl-benzotriazole | DMF | <1.0 |
| 1 | " | DMF | <1.0 |
| 2 | 1-hydroxy-4-methyl-benzotriazole | DMF | <1.0 |
| 1 | " | DMF | <1.0 |
| 1 | 1-hydroxy-5,6-dimethyl-benzotriazole | DMF | <1.0 |
| 2 | 1-hydroxy-5,6-dimethyl-benzotriazole | DMF | 1.3 |
| 2 | 1-hydroxy-5-methoxy-benzotriazole | DMF | <1.0 |
| 1 | " | DMF | <1.0 |
| 2 | 1-hydroxy-6-methoxy-benzotriazole | DMF | <1.0 |
| 1 | " | DMF | 1.65 |
| 1 | 1-hydroxy-6-methyl-5-benzotriazole-carbonitrile | DMF | <1 |
| 2 | " | DMF | <2 |
| 1 | 4-chloro-1-hydroxy-7-methyl-6-nitro-benzotriazole | DMF | <1 |
| 2 | " | DMF | <1 |
| 1 | 1-hydroxy-4-methyl-6-nitro-benzotriazole | DMF | <1 |
| 2 | " | DMF | <2 |
| 1 | 6-chloro-1-hydroxy-5-methyl-benzotriazole | DMF | <1 |
| 2 | " | DMF | <1 |
| 1 | 6-chloro-1-hydroxy-5-isopropyl-benzotriazole | DMF | <1 |
| 2 | " | DMF | 1.4 |
| 2 | 4,5,6,7-tetrachloro-1-hydroxy-benzotriazole | DMF | 1.4 |

2. Test for racemization in the activation of peptides with dicyclohexyl-carbodiimide and 1-hydroxy-benzotriazole or N-hydroxy-succinimide 378.5 mg of BOC-Leu-Phe-OH (1 millimol) and the additive were dissolved in 2 ml of absolute DMF or tetrahydrofurane. The whole was cooled to 0° C. A solution that had been cooled to 0° C of 207 mg of DCC (1 millimol) in 1 ml of absolute DMF or tetrahydrofurane was added and the mixture was allowed to stand for 2 hours at 0° C. Then 209.7 mg of H-Val-OBu$^t$ · HCl (1 millimol) and 0.12 ml of N-ethyl-morpholine (1 millimol) were added. The whole was again allowed to stand for 3 hours at 0° C and for 15 hours at room temperature. The batch was then worked up as described in Example I 1.

The results are given in following Table 2.

Table 2

Tests for racemization in the activation of peptides with dicyclohexyl-carbodiimide and 1-hydroxy-benzotriazole or N-hydroxy-succinimide

| Equivalent | Additive | Solutions | % D-Phe-L-Val |
|---|---|---|---|
| 1 | N-hydroxy-succinimide | DMF | 2.3 |
| 1.2 | N-hydroxy-succinimide | DMF | 2.3 |
| 2 | N-hydroxy-succinimide | DMF | 1.65 |
| 1 | 1-hydroxy-benzotriazole | DMF | 4.4 |
| 1.2 | 1-hydroxy-benzotriazole | DMF | 8.4 |
| 2 | 1-hydroxy-benzotriazole | DMF | 9.3 |
| 1 | 1-hydroxy-benzotriazole | THF | <1.0 |

3. Preparation of BOC-Leu-Phe-OH 38 g of phenyl-alanine were dissolved in 345 ml of dioxane and 115 ml of 2N sodium hydroxide solution. 38 g of BOC-Leu-OSu were added and the whole was stirred for about 20 hours at room temperature. The precipitate (excess phenyl-alanine) was filtered off with suction and the filtrate was concentrated. The residue was distributed between 200 ml of ethyl acetate and 220 ml of 2N citric acid. The ethyl acetate phase was once again shaken with 2N citric acid and water, dried with sodium sulfate and concentrated. The residue was triturated with petroleum ether. Yield: 39.3 g; melting point: 108° – 111° C. After recrystallization from a mixture of ethyl acetate and petroleum ether: yield 33.3 g. Melting point: 112° – 115° C, $[\alpha]_D = -8.5°$ (c = 2, methanol).

4. Preparation of H-Val-OBu$^t$ · HCl

N-Carbobenzoxy-L-valine-tert.butyl ester was hydrogenated catalytically in methanol with a palladium catalyst and with the aid of an autotitrator at pH 5 (addition of 1 N-methanolic HCl).

H-Val-OBu$^t$ · HCl can be recrystallized from ethyl acetate. Melting point: 148° C, $[\alpha]_D = +19.22°$ C (c = 2, methanol).

II. Synthesis of Z-Val-Val-OCH$_3$ according to the dicyclohexyl-carbodiimide method with different additives A. One-Pot-Method (General prescription)

2.5 g of Z-Val-OH (10 millimols), 1.7 g of H-Val-OMe · HCl (10 millimols), 1.28 ml of N-ethyl-morpholine (10 millimols) and 10 – 20 millimols of a substituted 1-hydroxy-benzotriazole were cooled to 0° C in 20 ml of absolute tetrahydrofurane, while stirring. A solution that had been cooled to 0° C of 2.2 g of DCC in absolute tetrahydrofurane was added and the whole was stirred for one hour at 0° C and for 1 hour at room temperature. The precipitate was filtered off with suction. The filtrate was concentrated and the residue was dissolved in ethyl acetate. The solution was washed with saturated sodium bicarbonate solution, 2N hydrochloric acid, saturated sodium bicarbonate solution and water, dried with sodium sulfate, concentrated. The residue was triturated with petroleum ether. The results obtained with di-peptide ester using the different 1-hydroxy-benzotriazoles as additives are given in Table 3.

B. Pre-activation of the carboxyl component (General procedure)

2.5 g of Z-Val-OH (10 millimols) and 10 – 20 millimols of a substituted 1hydroxy-benzotriazole were added to 10 ml of absolute tetrahydrofurane and combined, at 0° C, with a cold solution of 2.2 g of DCC in absolute tetrahydrofurane. The whole was allowed to stand for 1 hour at 0° C and for 1 hour at room temperature, 1.7 g of H-Val-OMe.HCl (10 millimols) and 1.28 ml of N-ethyl-morpholine (10 millimols) were added and the mixture was stirred for 1 hour at room temperature. Working up was effected as described under A. The results obtained with di-peptide ester using the different 1-hydroxy-benzotriazoles as additives are given in Table 3.

Table 3
Preparation of Z-Val-Val-OMe

| No. | Method | Equiv. | Additive | Yield (%) | M.p. (0°C) |
|---|---|---|---|---|---|
| 1 | A | 2 | 1-hydroxy-6-benzotriazole sulfonic acid diethyl amide | 90.5 | 97–100 |
| 2 | A | 2 | 1-hydroxy-6-benzotriazole sulfonic acid methyl amide | 96.1 | 99–102 |
| 3 | A | 2 | 1-hydroxy-6-benzotriazole sulfonic acid amide | 90.5 | 100–102 |
| 4 | A | 2 | 1-hydroxy-6-trifluormethyl-benzotriazole | 90.5 | 94–97 |
| 5 | A | 2 | 1-hydroxy-6-methoxy-benzotriazole | 65.9 | 98–101 |
| 6 | B | 1 | " | 79.0 | 103–104 |
| 7 | A | 2 | 1-hydroxy-5-methoxy-benzotriazole | 80.0 | 107–109 |
| 8 | B | 1 | " | 83.5 | 98–100 |
| 9 | A | 2 | 1-hydroxy-5,6-dimethyl benzotriazole | 98.8 | 98–100 |
| 10 | B | 1 | " | 93.3 | 102–103 |
| 11 | A | 2 | 1-hydroxy-4-methyl-benzotriazole | 82.4 | 103–105 |
| 12 | B | 1 | " | 68.6 | 102–103 |
| 13 | A | 2 | 1-hydroxy-5-methyl-benzotriazole | 79.6 | 104–105 |
| 14 | B | 1 | " | 71.5 | 104–105 |
| 15 | A | 2 | 1-hydroxy-6-nitro-benzotriazole | 90.6 | 93–95 |
| 16 | A | 2 | 6-chloro-1-hydroxy-benzotriazole | 96.0 | 93–98 |
| 17 | A | 2 | 5-chloro-1-hydroxy-benzotriazole | 90.6 | 97–100 |
| 18 | A | 2 | 5,6-dichloro-1-hydroxy benzotriazole | 93.3 | 93–97 |
| 19 | A | 2 | 6-bromo-1-hydroxy-benzotriazole | 90.5 | 100–102 |
| 20 | A | 2 | 4-chloro-1-hydroxy-7-methyl6-nitro-benzotriazole | 80.0 | 96–99 |
| 21 | A | 2 | 6-chloro-1-hydroxy-5-methyl-benzotriazole | 91.0 | 95–99 |
| 22 | A | 2 | 1-hydroxy-6-methyl-5-benzotriazole-carbonitrile | 66.0 | 103–106 |
| 23 | A | 1 | 1-hydroxybenzotriazole | 82.4 | 92–103 |
| 24 | A | 2 | " | 93.4 | 99–102 |
| 25 | B | 1 | " | 90.7 | 103–107 |
| 26 | A | without addition | | 70.0 | 99–107 |
| 27 | A | 2 | N-hydroxy succinimide | 68.7 | 76–82 |
| 28 | B | 2 | " | 72.8 | 74–85 |
| 29 | B | 1.1 | " | 81.0 | 82–86 |

III. Synthesis of BOC-GiN-(Bz)-OBz
1. With unisolated BOC-Glu(OBT)OBz

To a solution cooled to 0° C of 3.4 g of BOC-Glu-OBz (10 millimoles) and 1.5 g of 1-hydroxy-benzotriazole (11 millimoles) in 20 ml of absolute tetrahydrofurane, a solution which had likewise been cooled to 0° C of 2.2 g of DCC in absolute tetrahydrofurane was added. The whole was allowed to stand for 1 hour at 0° C and for 1 hour at room temperature 1.1 ml of benzylamine was added and the mixture was allowed to stand for 1 hour at room temperature. The precipitate was then filtered off with suction and the filtrate was concentrated. The residue was dissolved in ethyl acetate and the solution was shaken successively with saturated sodium bicarbonate solution, 2N citric acid, saturated sodium bicarbonate solution and water, dried with sodium sulfate and concentrated. The residue was triturated with petroleum ether. Yield: 3.6 g (84.4 percent); melting point: 87° – 88° C. For further purification, the substance was dissolved in ethyl acetate and chromatographed on about 20 g of basic aluminum oxide (Woelm, activity degree I). The eluate was concentrated and the residue was triturated with petroleum ether. Yield: 2.9 g (68.1 percent). The substance was found to be chromatographically pure. Melting point: 92° – 94° C; $[\alpha]_D = -19.9°$ (c = 2, methanol).

2. With unisolated BOC-Glu(OSu)-OBz (with 2 equivalents of N-hydroxy-succinimide)

The batch was prepared as described under III 1. Instead of 1-hydroxy-benzotriazole, 2.3 g of N-hydroxy-succinimide (20 millimoles) were added. The residue was not crystallizable with petroleum ether. After purification over a basic aluminum hydroxide 1.75 g (41.4 percent) crystallized. Melting point: 75° – 77° C. The substance was chromatographically not pure.

3. With unisolated BOC-Glu(OSu)OBz (with 1 equivalent of N-hydroxy-succinimide)

The batch was prepared as described under III 1. Instead of 1-hydroxy-benzotriazole, 1.15 g of N-hydroxy-succinimide (10 millimoles) were added. The residue was not crystallizable with petroleum ether. After purification over a basic aluminum oxide column, 2.2 g (51.5 percent) crystallized; melting point: 88° – 90° C. In thin-layer chromatography, the substance was almost pure.

IV. Peptide Syntheses with Z-Phe-OBT
1. Z-Phe-OBT

A solution cooled to 0° C of 22 g of DCC was added to a solution, which had likewise been cooled to 0° C, of 30 g of Z-Phe-OH (0.1 mol) and 15 g of 1-hydroxy-benzotriazole (0.11 mol) in 300 ml of absolute tetrahydrofurane. The whole was allowed to stand for 1 hour at 0° C and for 1 hour at room temperature. The precipitate was filtered off with suction and the filtrate was concentrated. The residue was recrystallized from isopropanol. Yield: 28.9 g (69.5 percent); melting point: 120° – 122° C.

2. Z-Phe-Phe-OCH$_3$ 1.2 g of H-Phe-OCH$_3$ · HCl (5 millimols) were suspended in 20 ml of absolute tetrahydrofurane. The suspension was cooled to 0° C, 0.7 ml of N-ethyl-morpholine (5 millimols) was added and the whole was stirred for 5 minutes. Then, 2.1 g of Z-Phe-OBT were added and the mixture was stirred overnight. On the next day the precipitate was filtered off with suction and the filtrate was concentrated. The residue was dissolved in ethyl acetate and worked up as described under II A. Yield: 2.15 g (91 %); melting point: 148° – 150° C; $[\alpha]_D = -17.95°$ (c = 2, in dimethylformamide).

3. Z-Phe-Val-OCH$_3$ 0.9 g of H-Val-OCH$_3$ (5 millimols), 0.7 ml of N-ethyl-morpholine and 2.1 g of Z-Phe-OBT were reacted as described under IV 2. Yield: 1.95 g (94.5 percent); melting point: 110° – 112° C.

The product was chromatographed over 20 g of basic aluminum oxide (Woelm, activity degree I) in ethyl acetate. Yield: 1.7 g (82.5 percent); melting point: 111° – 113° C; $[\alpha]_D = -8.9°$ (c = 2, in dimethylformamide).

4. Kinetic tests to the synthesis of Z-Phe-Val-OCH$_3$ 115.2 mg of N-ethyl-morpholine (1 millimol) were dissolved in 5 ml of absolute tetrahydrofurane that had been cooled to 0° C. The solution was combined with 184 mg of H-Val-OCH$_3$ · HCl (1.1 millimol) and then, with stirring, with 458 mg of Z-Phe-OBT (1.1 millimol) or 436 mg of Z-Phe-OSu (1.1 millimol). The whole was then stirred at 0° C. The reaction was stopped at the desired time by the addition of 10 ml of 0.1-N hydrochloric acid. The free hydrochloric acid was then determined potentiometrically with 0.1-N sodium hydroxide solution with the aid of a glass electrode. The consumed quantity of 0.1-N-sodium hydroxide solution is proportional to the yield of peptide. The accompanying drawing shows the results of these kinetic tests.

V. Synthesis of a protected deca-peptide having the sequence of antamanide (Z-Phe-Phe-Pro-Pro-Phe-Phe-Val-Pro-Pro-Ala-OBu$^t$)

1. Z-Pro-Pro-OH (MW 346)

370 g of Z-Pro-ONP (1 mol) and 127 g (1.1 mol) of Pro were boiled in the presence of 140 ml (1 mol) of triethylamine for 4 hours in ethanol. The solvent was removed by distillation under reduced pressure, the residue was dissolved in 1.5 liter of water and extracted twice with each time 250 ml of ether. The aqueous phase was acidified with semi-concentrated HCl to pH 2, whereupon a crystalline precipitate was obtained which was recrystallized from a small amount of ethanol. Yield: 256 g (74 percent); melting point 188° – 189° C; $[\alpha]_D^{20} = -101°$ (c = 2, in 50 % DMF).

2. H-Pro-Pro-OH (MW 212)

60 g (0.173 mol) of Z-Pro-Pro-OH were hydrogenated in 500 ml of 80 percent methanol in the presence of palladium catalyst. After separation of the catalyst by filtration, the solvent was removed by distillation under reduced pressure, the residue was triturated with acetone, filtered off and washed with ether. Yield: 35.2 g (96 % of the theory); $[\alpha]_D^{20} = -160°$ (c = 2, in water).

3. Z-Phe-Phe-OH (MW 446)

66 g of Phe (0.4 mol) were dissolved in a mixture of 800 ml of dioxane and 200 ml of 2N-NaOH. 79.2 g (0.2 mol) of Z-Phe-OSu were added and the whole was stirred overnight at room temperature. The Phe that had precipitated was filtered off. The filtrate was evaporated to dryness under reduced pressure, the residue was dissolved in 400 ml of ethyl acetate, shaken with 2N-HCl and water, the ethyl acetate phase was dried over sodium sulfate and and the solvent was removed by distillation. The residue was recrystallized from a mixture of ethanol and water (3 : 1). Yield: 69.0 g (77.4 percent of the theory); melting point: 158° – 160° C. Molecular weight: Calc.: 446, Found: (titration) 445.

4. Z-Phe-Phe-Pro-Pro-OH

The hydroxy-succinimide ester was prepared in the usual manner at −5° C from 44.6 g (0.1 mol) of Z-Phe-Phe-OH, 23 g (0.2 mol) of HOSu and 22 g (0.107 mol) of DCC in 400 ml of THF. After addition of DCC the whole was stirred for 1 hour at −5° C and for 2 hours at room temperature. Urea (2.3 g) was removed by filtration with suction and the mixture of solvents was distilled off under reduced pressure. The residue was recrystallized from ethanol. Yield: 42.5 g (78.2 percent); melting point: 148° – 151° C; $[\alpha]_D^{20} = -30.9°$ (c = 1, in DMA). 37.8 g (70 millimols) of this hydroxy-succinimide ester and 15.4 g (73.5 millimols) of H-Pro-Pro-OH were stirred in 150 ml of DMF. After 45 minutes, the total amount of H-Pro-Pro-OH had passed into solution. 8.1 g (70 millimols) of N-ethyl-morpholine were added and the whole was stirred overnight at room temperature. After removal of the solvent by distillation under reduced pressure, the residue was dissolved in 200 ml of ethyl acetate, shaken with 1N-HCl and a small amount of water, dried over sodium sulfate and the ethyl acetate was removed by distillation. The residue was dissolved in a small amount of acetone. Upon addition of 8.5 ml of cyclohexylamine and 300 ml of ether a precipitate separated which, after standing for several hours at 0° C, was filtered off, dried and recrystallized from isopropanol. Yield: 29.0 g (64.8 percent); melting point: 194° – 196° C; $[\alpha]_D^{20} = -101°$ (c = 0.3 in methanol).

C$_{42}$H$_{52}$N$_5$O$_7$ (739.8)

Calc.: C 68.2 H 7.08 N 9.47
Found: C 68.2 H 7.2 N 9.6

For setting free the acid, the compound was dissolved in ethyl acetate, the solution was shaken twice with each time 50 ml of 1N-HCl washed with a small amount of water, dried over sodium sulfate and the ethyl acetate was removed by distillation under reduced pressure. The yield was almost quantitative.

5. Synthesis of H-Pro-Pro-Ala-OBu$^t$ · HCl a. According to the dicyclohexyl-carbodiimide method with the addition of 2 equivalents of 1-hydroxy-benzotriazole A cold solution of 2.2 g of DCC in absolute DMF was added at 0° C to a solution of 3.46 g of Z-Pro-Pro-OH (10 millimols), 1.82 g of H-Ala-OBu$^t$ · HCl (10 millimols), 2.7 g of 1-hydroxy-benzotriazole (20 millimoles) and 1.28 ml of N-ethyl-morpholine (10 millimols) in 30 ml of absolute DMF. The whole was allowed to stand for 2 hours at 0° C and for 1 hour at room temperature. The precipitate was filtered off, the solution was concentrated, and the residue was distributed between ethyl acetate and water. The ethyl acetate phase was washed successively with saturated sodium bicarbonate solution, 2N citric acid, saturated sodium bicarbonate solution and water, dried with sodium sulfate and concentrated. The residue was chromatographed over about 20 g of basic aluminum oxide (Woelm, activity degree I) in ethyl acetate. The eluate was concentrated. The yield of oily Z-Pro-Pro-Ala-OBu$^t$ was 4.0 g (84.5 percent).

The oily Z-Pro-Pro-Ala-OBu$^t$ was hydrogenated catalytically in methanol with the addition of a palladium catalyst. A pH of 5 was maintained with the aid of an autotitrator by the addition of 1N-methanolic hydrochloric acid. When the reaction was complete (no further uptake of methanolic hydrochloric acid), the catalyst was removed by filtration. The filtrate was concentrated and triturated with ether. Yield: 2.75 g (73.2 %, referred to Z-Pro-Pro-OH). This substance was chromatographically uniform. Melting point: 147° – 151° C; $[\alpha]_D = -152°$ (c = 2, in methanol).

b. According to the dicyclohexyl-carbodiimide method with the addition of 2 equivalents of N-hydroxy-succinimide.

The batch was prepared as described under V 5a. Instead of 1-hydroxy-benzotriazole, 2.3 g of N-hydroxy-succinimide (20 millimoles) were added. Yield of oily Z-Pro-Pro-Ala-OBu$^t$: 3.1 g (65.5 percent).

After catalytic hydrogenation, 1.8 g of H-Pro-Pro-Ala-OBu$^t$ · HCl could be isolated (47.8 %, referred to Z-Pro-Pro-OH). Melting point: 147° – 151° C. A ninhydrin negative substance could be detected in traces by thin-layer chromatography.

c. With not isolated Z-Pro-Pro-OBT

A solution of 2.2 g of DCC, dissolved in cold DMF, was added at 0° C to a solution of 3.46 g of Z-Prop-Pro (10 millimoles) and 1.5 g of 1-hydroxy-benzotriazole (11 millimoles) in 30 ml of absolute DMF. The whole was allowed to stand for 1 hour at 0° C and for 1 hours at room temperature. Then 1.82 g of H-Ala-OBu$^t$ · HCl (10 millimoles) and 1.28 ml of N-ethyl-morpholine (10 millimoles) were added. After a further hour at room temperature, working up was effected as described under VI 5a. 4.45 g of oily Z-Pro-Pro-Ala-OBu$^t$ (94.1 percent) were obtained.

After catalytic hydrogenation, 3.12 g of H-Pro-Pro-Ala-OBu$^t$ · HCl (83 percent, referred to Z-Pro-Pro-OH) were obtained. Melting point: 145° – 150° C. The substance was found to be chromatographically uniform.

6. Z-Val-Pro-Pro-Ala-OBu$^t$

A cold solution of 4.05 g of DCC in absolute tetrahydrofurane was added at 0° C to a solution of 4.6 g of Z-Val-Oh (18.3 millimols) and 2.75 g of 1-hydroxy-benzotriazole (20.4 millimols) in 45 ml of absolute tetrahydrofurane. The whole was allowed to stand for 1 hour at 0° C and for 1 hour at room temperature. Then, 5.8 g of H-Pro-Pro-Ala-OBu$^t$ · HCl (15.5 millimols) and 1.98 ml of N-ethyl-morpholine (15.5 millimols) were added with stirring. The whole was stirred for 1 hour at room temperature, the precipitate was filtered off, the filtrate was concentrated, and working up was effected as described under V 5a.

Yield: 8.4 g of oil (95 percent).

7. Z-Phe-Phe-Val-Pro-Pro-Ala-OBu$^t$ 8.4 g of Z-Val-Pro-Pro-Ala-OBu$^t$ (14.67 millimols) were hydrogenated in methanol with the addition of a palladium catalyst. The pH was maintained at 5 with the aid of an autotitrator by the addition of 1-N methanolic hydrochloric acid. When the reaction was complete, the catalyst was removed by filtration, the eluate was concentrated, and the residue was triturated with ether. The ether was decanted off and the oil was dried in a high vacuum. An amorphous mass of 6.8 g (14.3 millimols) of H-Val-Pro-Pro-Ala-OBu · HCl (97.6 percent) was formed which was dissolved together with 6.45 g of Z-Phe-Phe-OH (14.4 millimols), 3.85 g of 1-hydroxy-benzotriazole (28.5 millimols) and 1.83 ml of N-ethyl-morpholine (14.3 millimols) in 50 ml of absolute DMF. A cold solution of 3.15 g of DCC in absolute DMF was added at 0° C and the whole was stirred for 2 hours at 0° C and for 1 hour at room temperature. The precipitate was filtered off with suction and the filtrate was concentrated. The residue was dissolved in ethyl acetate and extracted by shaking as described under V 5a, dried with sodium sulfate, concentrated and triturated with petroleum ether.

Yield: 11.2 g (88 percent, referred to Z-Val-Pro-Pro-Ala-OBu$^t$ initially used). For purification, the product was chromatographed in tetrahydrofurane over basic aluminum oxide (Woelm, activity degree I).

Yield: 9.05 g (71.1 percent, referred to Z-Val-Pro-Pro-Ala-OBu$^t$). The melting point was unsharp (110° – 145° C). $[\alpha]_D = -126°$ (c = 2, in methanol).

The substance was chromatographically uniform.

When, instead of 1-hydroxy-benzotriazole, 2 equivalents of N-hydroxy-succinimide were added 78 % of crude Z-Phe-Phe-Val-Pro-Pro-Ala-OBu$^t$ were isolated. From this crude substance, only about 75 percent could be recovered after purification over aluminum oxide. $[\alpha]^D = -126°$ (c = 2, in methanol).

8. H-Phe-Phe-Val-Pro-Pro-Ala-OBu$^t$

Palladium catalyst was added to a solution of 8.9 g of Z-Phe-Phe-Pro-Pro-Val-Pro-Pro-Ala-OBu$^t$ in methanol and hydrogenation was effected as usual while maintaining the pH at 5 by adding methanolic hydrochloric acid with the aid of an autotitrator. When the hydrogenation was complete, the catalyst was removed by filtration and the filtrate was concentrated under reduced pressure. The residue was dissolved in water and insoluble matter was filtered off. The filtrate was adjusted to pH 9 by means of sodium bicarbonate solution and the oil that precipitate was extracted thrice with ethyl acetate. The combined ethyl acetate phases were dried with sodium sulfate and concentrated. 7.3 g of an amorphous substance remained behind (97.4 percent). The substance was found to be chromatographically uniform.

9. Z-Phe-Phe-Pro-Pro-Phe-Phe-Val-Pro-Pro-Ala-OBu$^t$ a. According to the dicyclohexyl-carbodiimide method with addition of 2 equivalents of 1-hydroxy-benzotriazole 8.1 g of Z-Phe-Phe-Pro-Pro-OH · CHA (11 millimols) were distributed between ethyl acetate and 2N hydrochloric acid. The ethyl acetate phase was washed with water, dried over sodium sulfate and concentrated. The residue was dissolved in 40 ml of DMF and combined with 7.3 g of H-Phe-Phe-Val-Pro-Pro-Ala-OBu$^t$ (10 millimols) and 2.7 g of 1-hydroxy-benzotriazole (20 millimols). The whole was cooled to −10° C and a solution of 2.2 g of DCC, dissolved in cold DMF, was added. The mixture was allowed to stand for 4 hours at a very low temperature and then overnight at room temperature. On the next day, it was concentrated and the residue was dissolved in ethyl acetate and extracted as described under V 5a. The residue was dissolved in tetrahydrofurane and chromatographed over a basic aluminum oxide column. The eluate was concentrated and dried in a high vacuum. An amorphous substance remained behind which was found to be thin-layer chromatographically uniform.

Yield: 12.4 g (91.4 percent).

b. With addition of 2 equivalents of N-hydroxy-succinimide

The batch was prepared as described under VI ga. Instead of 1-hydroxy-benzotriazole, 2 equivalents of N-hydroxy-succinimide were added. Yield: 61 percent.

VI. NPS-AsN(Mbh)-Cys(Mmb)-Pro-Lys-(Boc)-Gly-NH-Mbh

1. H-Gly-NH-Mbh· HCl a. From Z-Gly-NM-Mbh:

2.1 g of Z-Gly-NH₂ and 2.4 g of 4,4'-dimethoxy-benzhydrol were dissolved in 20 ml of glacial acetic acid. One drop of concentrated $H_2SO_4$ was added and the whole was allowed to stand overnight. On the next day it was diluted with 40 ml of water and cooled. The crystal magma that precipitated was filtered off with suction. The filter residue was dissolved in ethyl acetate. The ethyl acetate solution was shaken once with water, dried with sodium sulfate and concentrated. Yield: 3.6 g (83 percent); melting point: 148° – 150° C (alcohol).

44.7 g of Z-Gly-NM-Mbh were suspended in a mixture of 300 ml of methanol and 300 ml of glacial acetic acid and hydrogenated catalytically with a palladium catalyst. The catalyst was then removed by filtration with suction and the filtrate was concentrated. The residue was dissolved in methanol and titrated with methanolic hydrochloric acid against thymol blue. Concentration was repeated and the residue was triturated with ether. Yield: 33.9 g (98 percent). After recrystallization from a mixture of methanol and ether: 31.7 g (91.6 percent). Melting point: 202° – 204° C.

b. From chloroacetic acid-4,4'-dimethoxy-benzhydrylamide:

18.7 g of chloroacetic acid amide and 48 g of 4,4'-dimethoxy-benzhydrol were reacted in 200 ml of glacial acetic acid and 0.5 ml of concentrated $H_2SO_4$, as described for the preparation of Z-Gly-NM-Mbh. Yield: 45.75 g (72 %); melting point: 125°–126° C.

220 ml of condensed ammonia were added to a solution of 88.5 g of chloroacetic acid-4,4'-dimethoxy-benzhydryl amide in 880 ml of methanol and the whole was heated in an autoclave for 24 hours to 60° – 70° C. It was then concentrated and the residue was distributed between ethyl acetate and a sodium bicarbonate solution. The ethyl acetate phase was washed with water, dried with sodium sulfate and concentrated. The residue was dissolved in methanol and combined with methanolic hydrochloric acid until a pH of 6 was reached. Concentration was continued and the residue was triturated with ether. Melting point: 173° – 176° C.

For purification, the product was dissolved in water and treated with animal charcoal. The clear solution in water was concentrated and the residue was recrystallized from a mixture of methanol and ether. Yield: 59.3 g (63.6 percent). Melting point: 197° – 199° C.

2. Z-Lys(BOC)-Gly-NH-Mbh 6.1 g of Z-Lys-(BOC)-OH · DCHA (11 millimols) were distributed between ethyl acetate and 20 ml of 2N citric acid at 0° C. The ethyl acetate phase was washed with 2N citric acid and water, dried with sodium sulfate and concentrated. The residue was dissolved in 20 ml of absolute tetrahydrofurane. To this solution, 1.5 g of 1-hydroxy-benzotriazole (11 millimols) and, at 0° C, a solution of 2.2 g of DCC in cold DMF were added. The whole was allowed to stand for 1 hour at 0° C and for 1 hour at room temperature and then, 3.4 g of H-Gly-NH-Mbh · HCl (10 millimols) and 1.3 ml of N-ethyl-morpholine (10 millimols) were added. The mixture was stirred for 1 hour at room temperature. The precipitate was filtered off with suction, the filtrate was concentrated. The residue was dissolved in warm ethyl acetate and a sodium bicarbonate solution. The ethyl acetate solution was shaken with 2N citric acid, saturated sodium bicarbonate solution and water, dried with sodium sulfate and concentrated. The residue was recrystallized from a mixture of ethyl acetate and petroleum ether.

Yield: 6.0 g (90.7 percent); melting point 123° – 125° C; $[\alpha]_D = +8.9°$ (c = 2, in methanol).

3. H-Lys-(BOC)Gly-NH-Mbh · HCl 9.6 g of Z-Lys(BOC)-Gly-NH-Mbh were suspended in methanol. A palladium catalyst was added and catalytic hydrogenation was effected while adding dropwise 1N-methanolic hydrochloric acid (autotitrator, pH 5). The catalyst was removed by filtration with suction and the solution was concentrated. The residue was triturated with ether.

Yield: 7.3 g (89 percent). After recrystallization from a mixture of methanol and ether, the melting point was at 158° – 160° C. $[\alpha]_D = +17.55°$ (c = 2, in methanol).

4. Z-Pro-Lys(BOC)-Gly-NH-Mbh 2.6 ml (20 millimols) of N-ethyl-morpholine were added at 0° C and then, while stirring, a cold solution of 4.4 g of DCC in DMF was added to a suspension of 5 g of Z-Pro-OH (20 millimols), 11.4 g of H-Lys-(BOC)-Gly-NH-Mbh · HCl (20 millimols) and 5.4 g of 1-hydroxy-benzotriazole (40 millimols) in 60 ml of DMF. The whole was stirred for 1 hour at 0° C and for 1 hour at room temperature. The precipitate was filtered off with suction and the filtrate was concentrated and worked up as described under V 2.

Yield: 14.1 g (93 percent); melting point: 180° – 183° C. Recrystallizable from a mixture of methanol and water. $[\alpha]_D = -27.4°$ (c = 2, in DMF).

5. H-Pro-Lys(BOC)-Gly-NH-Mbh · HCl 18.5 g of Z-Pro-Lys(BOC)-Gly-Nh-Mbh were hydrogenated catalytically in methanol as described under VI 3.

Yield: 15.2 g (100 percent); sintering from 100° C onwards (amorphous).

6. Z-AsN(Mbh)-OH 0.5 ml of concentrated $H_2SO_4$ was added at room temperature to a solution of 27 g of Z-Asn-OH and 24 g of 4,4'-dimethoxy-benzhydrol in 250 ml of glacial acetic acid. The whole was allowed to stand overnight at room temperature and then poured into 750 ml of water. The crystal magma that precipitated was filtered off with suction and dissolved hot in ethyl acetate. The ethyl acetate solution was shaken with water, dried with sodium sulfate and evaporated under reduced pressure. The residue was titrurated with ether and filtered off with suction. Yield: 47.5 g (96 percent); melting point: 176° – 180° C; $[\alpha]_D^{22} = +2.4°$ (c = 2, in dimethylformamide).

H-AsN(Mbh)-OH 49.2 g of Z-AsN(Mbh)-OH were suspended in 400 ml of glacial acetic acid and hydrogenated catalytically in the usual manner. After completed hydrogenation, the catalyst was removed by filtration and the filtrate was concentrated under reduced pressure. The residue was triturated with sodium acetate solution, filtered with suction, washed thoroughly with water and dried over $P_2O_5$. Yield: 33.6 g (94 percent); melting point: 215° – 217° C.

NPS-AsN(Mbh)-OH · CHA 33.6 g of H-AsN(Mbh)-OH were dissolved in 46 ml of 2N NaOH and 116 ml of dioxane. 19.6 g of o-nitro-sulfenyl chloride and 46 ml of 2N sodium hydroxide solution were added portionwise, while maintaining the pH at 8. The mixture was then diluted with 930 ml of water, acidified with citric acid (pH 3) and the aqueous phase was extracted twice by shaking with ethyl acetate. The ethyl acetate was dried with sodium sulfate and combined with cyclohexylamine until a basic reaction could be observed. A yellow crystal magma precipitated which was filtered off with suction and washed with ethyl acetate. Yield: 47.5 g (85 percent); melting point: 182° – 184° C; $[\alpha]_D^{22} = -29.8°$ (c = 1, in dimethylformamide).

NPS-AsN-Mbh)-OSu 18.6 g of NPS-AsN(Mbh)-OH · CHA (30.5 millimols) were distributed between ethyl acetate and about 80 ml of 2N citric acid at 0° C. The ethyl acetate phase was washed with 2N citric acid and water, dried with sodium sulfate and concentrated. The residue was dissolved in 100 ml of tetrahydrofurane, combined with 3.45 g of N-hydroxy-succinimide (30 millimols), cooled to 0° C and mixed with a solution of 6.2 g of DCC in cold tetrahydrofurane. The whole was stirred for 1 hour at 0° C and for 1 hour at room temperature, and was then combined with a small amount of dimethylformamide. The dicyclohexyl-urea that precipitated was filtered with suction and the filtrate was concentrated. The residue was boiled up with isopropanol. Yield: 14.3 g (77 percent); melting point: 172° – 174° C; $[\alpha]_D = +15.3°$ (c = 2, in DMF).

7. NPS-AsN-(Mbh)-Cys(Mbh)-OH · CHA 2.5 g of NPS-AsN(Mbh)-OSu were added, while stirring, to a solution of 2.25 g of H-Cys(Mmb)-OH (8.2 millimols) in 20 ml of dioxane and 4.1 ml of 2N sodium hydroxide solution and the whole was allowed to stand overnight. The solution, which already was neutral, was concentrated and the residue was distributed between ethyl acetate and 2N citric acid. H-Cys(Mmb)-OH which had precipitated and which had been used in excess was filtered off with suction. The ethyl acetate phase was washed once with 2N citric acid and once with water and dried with sodium sulfate. The salt was precipitated with cyclohexylamine.

Yield: 2.45 g (69.5 percent); melting point: 198° – 202°C.

8. NPS-AsN(Mbh)-Cys(Mmb)-Pro-Lys(BOC)-Gly-NH-Mbh 4.3 g of NPS-AsN(Mbh)-Cys(Mmb)-OH·CHA (5 millimols) were distributed while cooling with ice between ethyl acetate and 2N citric acid. The ethyl acetate phase was washed with 2N citric acid and water, dried with sodium sulfate and concentrated. The residue was dissolved in 20 ml of DMF. The solution was combined with 3.15 g of H-Pro-Lys(BOC)-Gly-NH-Mbh· HCl (5 millimols), 0.64 ml of N-ethyl-morpholine (5 millimols) and 0.7 g of 1-hydroxy-benzotriazole (5 millimoles), cooled to 0° C and combined, with stirring, with 1.1 g of DCC dissolved in a small amount of cold DMF. The whole was stirred for 1 hour at 0° C and for 1 hour at room temperature. The precipitate was filtered off with suction and the filtrate was concentrated. The residue was dissolved in ethyl acetate and extracted by shaking as described under VI 2. The residue was chromatographed over neutral aluminum oxide (Woelm, activity degree I) in tetrahydrofurane.

Yield: 4.95 g (77 percent); melting point: 160° – 164°C; $[\alpha]_D = -12.45°$ (c = 2, in dimethylformamide).

VII. Synthesis of asparaginyl- and glutaminyl-peptides

1. Z-AsN-Leu-OCH$_3$ 1.28 ml of N-ethyl-morpholine (10 millimoles) and, finally, a cold solution of 2.1 g of DCC in a small amount of DMF were added at 0° C to a solution of 2.7 g of Z-AsN-OH (10 millimols), 1.7 g of H-Leu-OCH$_3$·HCl (10 millimols) and 2.7 g of 1-hydroxybenzotriazole in 30 ml of DMF. The whole was stirred for 1 hour at 0° C and for 1 hour at room temperature. The precipitate was filtered off with suction and the filtrate was combined with water. The precipitate that had separated was filtered off with suction, triturated with sodium bicarbonate solution, again filtered off with suction and washed with water and dried over phosphorus pentoxide.

Yield: 3.35 g (85 percent); melting point: 176° C; $[\alpha]_D = -26.3°$ (c = 2, in methanol).

2. z-GiN-Ala-OBu$^t$ 1.28 ml of N-ethyl-morpholine (10 millimols) and, finally, a cold solution of 2.1 g of DCC in a small amount of DMF were added at 0° C to a solution of 2.8 g of Z-GlN-OH (10 millimols), 1.8 g of H-Ala-OBu$^t$ · HCl (10 millimols) and 1.35 g of 1Hydroxy-1,2,3-benzotriazole (10 millimols) in DMF. Further operations were as described under VII 1.

Yield: 3.0 g (73.7 %); melting point: 158° – 161° C; $[\alpha]_D = -36.0°$ (c = 2, in methanol).

When 2 equivalents of 1-hydroxy-1,2,3-benzotriazole were added, the yield was 2.9 g (71.2 percent); melting point: 158°–161°C.

VIII. Z-Ser-Gly-ONB 1.3 ml of ethyl-morpholine and, finally, a cold solution of 2.2 g of DCC in DMF were added at 0° C to a solution of 2.4 g of Z-Ser-OH (10 millimols), 2.7 g of 1-hydroxy-benzotriazole (20 millimols) and 2.9 g of H-Gly-ONB · HBr in 30 ml of DMF. The whole was stirred for 1 hour at 0° C and for 1 hour at room temperature and then worked up as described under II 1.

Yield: 4.2 g (97.5 percent); melting point: 121° – 123°C; $[\alpha]_D = -8.2°$ (c = 2, in glacial acetic acid).

IX. Corticotropin-(1-23)-tricosa-peptide-amide 8.25 g of BOC-Ser-Tyr-Ser-Met-Glu(OBu$^t$)-His-PheAgr-Trp-Gyl-OH (5.5 millimols), prepared according to Chem. Ber. 96, 1,080, (1963), and 12.5 g (5 millimols) of H-Lys(BOC)-Pro-Val-Gly-Lys-(Boc)-Lys (Boc)-Arg-Arg-Pro-Val-Lys(Boc)-Val-Tyr-NH$_2$-tritosylate, which had been obtained from the acetate prepared according to Chem. Ber. 97, 1197 (1964) by adding the calculated amount of toluenesulfonic acid in water, evaporation of the solvent under reduced pressure and dissolving and reprecipitating the residue from a mixture of pyridine and ether, were dissolved in 150 ml of DMF. After the addition of 2.7 g of 1-hydroxy-benzotriazole (20 millimoles), one third of the solution of 6.5 g (30 millimols) of DCC in 20 ml of DMF was added at room temperature. After 1 hour, a further third and after another hour the last third of the DCC solution were added. After 2 hours the crude reaction product was precipitated with ether. Yield: 19.9 g. The protective groups were split off in known manner by treatment for 1 hour with 90 percent trifluoracetic acid which contained a small amount of thio-glycolic acid. The crude tricosapeptide was precipitated by means of ether and washed with ether. Yield: 19.1 g. For purification, the product was chromatographed in known manner on carboxy-methyl cellulose.

X. Z-Leu-Ala-Leu-Glu(OBu$^t$)-Gly-Pro-Pro-GlN-Lys(BOC)-Arg-OH (Sequence 54 – 63 of pig's pro-insulin (The preparation of the starting peptides is described hereinafter)

11.5 g (18 millimols) of Z-Leu-Ala-Leu-Glu-(OBu$^t$)-OH and 2.43 g (18 millimols) of 1-hydroxy-benzotriazole in 80 ml of DMF were combined at $-10°$ C while stirring, with 3.7 g (18 millimols) of DCC in 25 ml of DMF. The whole was stirred for 2 hours at room temperature freed from urea by filtration and combined with the solution of 13.3 g (15 millimols) of H-Gly-Pro-Pro-GlN-Lys(Boc)-Arg-OH, 1.5 ml of CH$_3$COOH, H$_2$O and 1.92 ml (15 millimols) of N-ethyl-morpholine in 80 ml of DMF. The whole was stirred for 2 hours at room temperature. The solvent was removed by distillation under reduced pressure and the residue was triturated with ethyl acetate. Yield of crude product: 17.1 g. The compound was boiled thrice with ethyl acetate. The dried substance was then triturated thoroughly with water. Yield: 15.5 g (73.5 percent). Thin-layer chromatography: impurities in traces only. $[\alpha]_D^{20} = -80.0°$ C (c = 2, in methanol).

Amino-acid analysis:
Calc.: Glu$_2$ Pro$_2$ Gly$_1$ Ala$_1$ Leu$_2$ Lys$_1$ Arg$_1$
Found: Glu$_{2.05}$ Pro$_{1.84}$ Gly$_{0.98}$ Ala$_{1.02}$ Leu$_{2.00}$ Lys$_{1.03}$ Arg$_{0.92}$
NH$_2$ Calc.: 1 equivalent
Found: 1.09 equivalent Preparation of the starting products for Example X:

a. Z-Lys(Boc)-Arg(NO$_2$)-OCH$_3$ (596)

57 g (0.2 mol) of H-Arg(NO$_2$)-OCH$_3$ · HCl were stirred overnight with 95 g (0.2 mol) of Z-Lys-(BOC)-OSu in 500 ml of DMF. After removal of the solvent by distillation under reduced pressure, a resin remained behind which was dissolved in ethyl acetate and extracted at 0° C with 2N citric acid, bicarbonate and water. The solution was dried over Na$_2$SO$_4$ and the solvent was removed by distillation under reduced pressure. The residue formed a jelly which was triturated with ether and dried at the air. Yield: 106 g (89 percent). TC: pure. For analysis, a sample of the product was recrystallized from ethyl acetate. Melting point: 130° – 132° C; $[\alpha]_D^{20} = -12.5°$ (c = 1, in methanol).
C$_{26}$H$_{41}$N$_7$O$_9$ (595.6);
Calc. C = 52.4 H = 6.94 N = 16.5
Found C = 52.4 H = 7.1 N = 16.7.

b. Z-Lys(BOC)-Arg(NO$_2$)-OH (581.6)

89 g (0.15 mol) of the ester prepared according to (a) were dissolved in a mixture of 240 ml of water and 500 ml of dioxane. The solution was combined with 180 ml of 1N-NaOH, stirred for 45 minutes at room temperature and rendered neutral by means of 30 ml of 1N-HCl. The dioxane was removed by distillation under reduced pressure. The water phase was extracted twice with ethyl acetate and acidified with precaution of 0° C with 150 ml of 1N-HCl. Thereupon an oil separated which was dissolved in ethyl acetate. After washing of the solution with water, the solvent was removed by distillation with the addition of benzene. The resinous residue solidified upon trituration with petroleum ether. Yield: 79 g (91 percent). TC: almost pure, a trace of ester. A sample of the product was boiled with ethyl acetate; TC: pure. Melting point: 168° – 171° C; $[\alpha]_D^{20} = -4.8°$ (c = 1, in methanol).
C$_{25}$H$_{39}$N$_7$O$_9$ (581.6)
Calc.: C = 51.6 H = 6.76 N = 16.86
Found: C = 51.6 H = 6.8 N = 16.7.

c. H-Lys(Boc)-ArgOH . 2 CH$_3$COOH . H$_2$O (540)

75.5 g (0.13 mol) of the di-peptide obtained according to (b) were dissolved in 800 ml of a mixture of acetic acid, methanol and water (4:4:2) and hydrogenated catalytically on Pd. After removal of the catalyst by filtration, the filtrate was evaporated under reduced pressure. The residue was triturated with ether and dried over P$_2$O$_5$ and KOH. The content of acetic acid was found to depend on the drying conditions. Yield: 70 g (almost quantitative).
Acetic acid: Calc. for 2 mols: 22.2 Found: 21.8
Water: Calc. for 1 mol: 3.34 Found: 3.7.

d. Z-GlN-Lys(Boc)-Arg-OH (664)

70 g (0.13 mol) of the di-peptide obtained according to (c) were stirred for 24 hours at room temperature in 600 ml of DMF with the addition of 16.5 ml (0.13 mol) of N-ethyl-morpholine with 60 g (0.15 mol) of Z-GlN-ONp. The solvent was removed by distillation under reduced pressure. The residue was boiled with ethyl acetate and the insoluble peptide was filtered off while hot. For further purification it was dissolved in 150 ml of methanol and the solution was combined with 750 ml of 1N-NH$_3$, whereupon, the tri-peptide crystallized. Yield: 66.5 g (82 percent) TC: pure.

e. Z-Pro-Pro-GlN-Lys(Boc)-Agr-OH N-Lys(Boc)-Arg-OH (858)

The Z-tri-peptide (0.1 mol) prepared according to (d) was hydrogenated catalytically in 350 ml of DMF with the addition of a large amount of Pd(BaSO$_4$). The separation of the Z-group was completed after 2 hours. Then, 62 g (0.115 mol) of Z-Pro-Pro-OSu in 80 ml of DMF was added and the whole was stirred for 12 hours at room temperature. After removal of the solvent by distillation under reduced pressure, the residue was boiled in ethyl acetate, triturated with fresh ethyl acetate and washed with ether. Yield: 79.9 g. TC: the penta-peptide still contains about 10 percent of Pyr-Lys(Boc)-Arg-OH which had been formed from H-GlN-Lys(Boc)-Agr-OH and which cannot be separated in this stage. In the following reactions, however, it did not enter into reaction and could be easily split off in a later stage.

Z-Pro-Pro-OSu was prepared as follows:

69.2 g (0.2 mol) of Z-Pro-Pro-OH were suspended in 500 ml of CH$_2$Cl$_2$. 27.6 g (0.24 mol) of HOSu were added, the whole was stirred for 10 minutes, cooled to $-5°$ C and combined with 41.2 g (0.2 mol) of DCC in 100 ml of CH$_2$Cl$_2$. After stirring for 30 minutes at 0° C and for 2 hours at room temperature, the urea was filtered off and the filtrate was evaporated to dryness under reduced pressure. The resinous residue was dissolved in 500 ml of ethyl acetate, washed rapidly at 0° C with bicarbonate and water and dried over Na$_2$SO$_4$. The solution was evaporated to dryness under reduced pressure and completely freed from solvent in a high vacuum. Yield: 71 g (80 percent).

f. H-Pro-Pro-GlN-Lys(Boc)-Agr-OH (724)

71 g (82.5 millimols) of the Z-compound were hydrogenated in 800 ml of methanol with addition of palladium catalyst. After removal of the solvent by distillation under reduced pressure, the residue was triturated with ether. Yield: 58.2 g (97.5 percent). TC: obtained as impurity only the Pyr-Lys(Boc)-Arg-OH formed under (e).

g. Z-Gly-Pro-Pro-GiN-Lys(Boc)-Agr-OH (916)

36.2 g (50 millimols) of penta-peptide were stirred for 24 hours at room temperature in 200 ml of DMF with 34.8 g (90 millimols) of Z-Gly-OTCP. The solvent was removed by distillation under reduced pressure. The residue was dissolved in 100 ml of methanol and the reaction product was precipitated by means of 1 liter of ethyl acetate. For purification, the product was extracted several times with warm water. The aqueous extract was filtered and evaporated under reduced pressure. The residue was again dissolved and reprecipitated from a mixture of methanol and ethyl acetate. Yield: 37.1 g (81 percent). TC: in addition to Pyr-Lys(Boc)-Arg-OH no, further impurity.

h. H-Gly-Pro-Pro-GiN-Lys(Boc)-Arg-OH · 1.5 $CH_3COOH \cdot H_2O$ (890)

The Z-compound obtained according to (f) was hydrogenated catalytically in 300 ml of 90 percent acetic acid with the aid of palladium catalyst. After removal of the catalyst by filtration, evaporation of the filtrate under reduced pressure and trituration of the residue with ether and drying over $P_2O_5$ and KOH, the yield was 35 g (97 percent). The content of acetic acid was not stoichiometric and varied according to the drying conditions.

i. Z-Ala-Leu-Glu(OBu$^5$)-OCH$_3$ 25.4 g of H-Glu(OBu$^5$)-OCH$_3$ · HCl, 12.8 ml of N-ethyl-morpholine (0.1 mol) and, finally, a cold solution of 22 g of DCC in a small amount of tetrahydrofurane were added to a solution which had been cooled to 0° C of 26.5 g of Z-Leu-OH (0.1 mol) and 27 g of 1-hydroxy-benzotriazole (0.2 mol) in 200 ml of tetrahydrofurane. The whole was stirred for 1 hour at 0° C and for 1 hour at room temperature. The precipitate was filtered off with suction and the filtrate was worked up as described under II 1. The residue was chromatographed in ethyl acetate on basic aluminum oxide (Woelm, activity degree I). The eluate was concentrated under reduced pressure. Yield: 44.85 g of oil (96.6 percent). The oil was hydrogenated catalytically in methanol as described under V 8. The resulting dipeptide ester hydrochloride was oily. Yield: 34.8 g (95 millimols). This oil was dissolved with 21.2 g of Z-Ala-OH (95 millimols) and 26.6 g of 1-hydroxy-benzotriazole (190 millimols) in 200 ml of DMF. 12.2 ml of N-ethyl-morpholine (95 millimols) and a cold solution of 20.9 g of DCC in DMF were added at 0° C. The whole was allowed to stand for 1 hour at 0° C and for 1 hour at room temperature. The precipitate was filtered off with suction and the filtrate was worked up as described under II 1. The residue was chromatographed in tetrahydrofurane over a basic aluminum oxide column. The eluate was concentrated and triturated with petroleum ether. Yield: 40 g (74.7 percent, referred to Z-Leu-OH). Melting point: 96° – 98° C. $[\alpha]_D = -54.1°$ (c = 2, in methanol).

k. Z-Ala-Leu-Glu(OBu$^5$)-OH 15.85 g of Z-Ala-Leu-Glu(OBu$^t$)-OCH$_3$ (28.65 millimols) were added to a mixture of 100 ml of dioxane and 16 ml of water. 29 ml of 1N-sodium hydroxide solution were added slowly dropwise, within 2 – 3 hours (thymolphthalein as indicator). The mixture was then neutralized with 2N citric acid and concentrated. The residue was distributed between 2N citric acid and ethyl acetate. The ethyl acetate solution was washed once with water, dried with sodium sulfate and concentrated. The residue was crystallized from a mixture of ethyl acetate and petroleum ether. Yield: 14.05 g (91 percent). Melting point: 142° – 145° C. After recrystallization from a mixture of ethyl acetate and petroleum ether: melting point: 145° – 148° C; $[\alpha]_D = -45°$ (c = 2, in methanol).

l. Z-Leu-Ala-Leu-Glu(OBu$^t$)-OH 11 g of Z-Ala-Leu-Glu(OBu$^t$)-Oh were dissolved in a mixture of 50 ml of methanol and 50 ml of glacial acetic acid and hydrogenated catalytically after addition of palladium catalyst. The catalyst was filtered off with suction when the hydrogenation was complete, the filtrate was concentrated and the residue was triturated with ether. Yield: 7.95 g ; melting point: 214° – 215° C.

The product of the hydrogenation was suspended in 50 ml of DMF. This suspension was combined with 7.25 g of Z-Leu-OSu (20% excess) and then stirred for 1 day at room temperature. The solution was concentrated and the residue was distributed between ethyl acetate and 2N citric acid, the ethyl acetate phase was washed with water, dried with sodium sulfate and concentrated. Recrystallization was effected from ethyl acetate and petroleum ether. Yield: 10.45 g (82 percent; melting point: 186° – 189° C; $[\alpha]_D = -49.5°$ (c = 2, in methanol).

XI. Further isolated 1-hydroxy-benzotriazole ester

1. Z-Gly-OBT 2.1 g of Z-Gly-OH (10 millimols) and 1.5 g of 1-hydroxy-benzotriazole (11 millimols) were reacted in tetrahydrofurane with 2.2 g of DCC as described in Example IV 1. Yield: 1.6 g; melting point: 147° C (from isopropanol).

2. Z-Thr-OBT 2.6 g of Z-Thr-OH (10 millimols), and 1.5 g of 1-hydroxy-benzotriazole (11 millimols) were reacted with 2.2 g of DCC in tetrahydrofurane as described in Example IV 1. Yield: 2.5 g; melting point: 150° – 153° C (from isopropanol).

3. Z-AsN(Mbh)-OBT 4.6 g of Z-AsN(Mbh)-OH (10 millimols), and 1.5 g of 1-hydroxy-benzotriazole (11 millimols) were reacted with 2.2 g of DCC in DMF as described in Example IV 1. Yield: 4.0 g; melting point: 158° C (boiled up with isopropanol).

4. Z-Phe-(1-hydroxy-5-methyl-benzotriazole)-ester 11 g of DCC were added to a solution cooled to 0° C of 15 g of Z-Phenyl-alanine (50 millimols) and 8.25 g of 1-hydroxy-5-methyl-benzotriazole (55 millimols) in 150 ml of absolute tetrahydrofurane. The whole was stirred for 1 hour at 0° C and for 1 hour at room temperature. The precipitate was filtered off with suction and the filtrate was concentrated. The residue was recrystallized from isopropanol. Yield: 10.65 g (50 percent of the theory); melting point: 153° – 155° C.

5. Z-AsN(Mbh)-(1-hydroxy-6-trifluoromethyl-benzotriazole)-ester 2.2 g of DCC were added to a solution cooled to 0° C of 4.6 g of Z-AsN(Mbh)-OH (10 millimols) and 2.2 g of 1-hydroxy-6-trifluoromethyl-benzotriazole (11 millimols) in 30 ml of absolute tetrahydrofurane. The whole was stirred for 1 hour at 0° C and for 1 hour at room temperature, and diluted with a small amount of dimethylformamide. The precipitate was filtered off with suction and the filtrate was concentrated. The residue was boiled up with isopropanol, filtered off with suction and washed with ether. Yield: 2.75 g (41 percent of the theory); melting point: 170° – 173° C.

XII. Preparation of new 1-hydroxy-benzotriazoles substituted in the nucleus which may be used as additives General procedures:

a. 0.1 mol of an aromatic o-chloro-nitro compound was boiled for 5 hours under reflux in 50 ml of ethanol with 15 g of 100 percent hydrazine-hydrate (0.3 mol). The whole was cooled and the precipitate was filtered off with suction. If nothing precipitated, the mother liquor was concentrated. The precipitate or the residue was dissolved in water, and extracted with ether if necessary. The aqueous phase was acidified with concentrated hydrochloric acid and the precipitate was filtered off with suction. The results are shown in Table 4.

b. 0.1 mol of an aromatic o-chloro-nitro compound was heated for 10 hours to 110° C in an autoclave in 50 ml of alcohol with 15 g of 100 percent hydrazine-hydrate (0.3 mol). Working up was effected as described under (a). The results are shown in Table 4.

c. 0.1 mol of an aromatic o-chloro-nitro compound were boiled for 5 hours under reflux in 50 ml of ethanol with 27.2 ml of triethylamine (0.2 mol) and 5 g of 100 percent hydrazine-hydrate (0.1 mol). The whole was then concentrated and the residue was worked up as described under (a). The results are shown in Table 4.

Table 4
New 1-hydroxy-benzotriazoles substituted at the nucleus

| Compounds (recrystallized) | Method | Melting point | Analysis |
|---|---|---|---|
| 1-hydroxy-6-trifluoromethyl-benzotriazole (water) | a | 148–9 | $C_7H_4F_3N_3O$ (203.1) Calc. C 41.39, H 1.98, N 20.69; Found. 41.5, 2.2, 21.0 |
| (90 %) | | | |
| 1-hydroxy-6-benzotriazole-sulfonic acid-methyl amide (water) | a | 214 | $C_7H_8N_4O_3S$ (228.2) Calc. C 36.85, H 3.53, N 24.55, S 14.05; Found. 36.5, 3.8, 24.8, 13.8 |
| 1-hydroxy-6-benzotriazole-sulfonic acid-diethylamide (ethanol/water) | a | 159– | $C_{10}H_{14}N_4O_3S$ (270.3) Calc. C 44.45, H 5.22 N 20.73, S 11.84; Found. 44.7, 5.1, 20.8, 11.7 |
| 1-hydroxy-6-benzotriazole-carboxamide (alcohol 50 %) | a | 241 | $C_7H_6N_4O_2$, $1H_2O$ (196.1) Calc. C 42.80, H 4.11, N 28.58; Found. 42.7, 4.0, 27.4/29.8 |
| 1-hydroxy-5-methoxybenzotriazole(ethanol)b | | 215 | $C_7H_7N_3O_2$ (165.1) Calc. C 50.90, H 4.27, N 25.45; Found. 50.9, 4.2, 25.7 |
| (68 %) | | | |
| 1-hydroxy-6-methoxybenzotriazole(water)b | | 172–3 | $C_7H_7N_3.0.5H_2O$ (174.1) Calc. C 48.30, H 5.21, N 24.13; Found. 48.7, 5.1, 25.3 |
| (6 %) | | | |
| 1-hydroxy-5-methylbenzotriazole (water) | b | 188–9 | $C_7H_7N_3O$ (149.1) Calc. C 56.37, H 4.73, N 28.18; Found. 56.4, 4.7, 28.3 |
| (77 %) | | | |
| 1-hydroxy-4-methylbenzotriazole (ethanol) | b | 151.5– 152.5 | $C_7H_7N_3O$ (149.1) Calc. C 56.37, H 4.73, N 28.18; Found. 56.4, 4.8, 28.0 |
| (71 %) | | | |
| 1-hydroxy-5,6-dimethyl-benzotriazole (ethanol) | b | 193–4 | $C_8H_9N_3O$ (163.2) Calc. C 58.89, H 5.56, N 25.75; Found. 58.8, 5.5, 25.4 |
| (60 %) | | | |
| 1-hydroxy-6-methyl-5-benzotriazole-carbonitrile (ethanol/water) | b | 216 | $C_8H_6N_4O$ (174.2) Calc. C 55.17, H 3.47, N 32.17; Found. 54.4, 3.6, 32.1 |
| (17 %) | | 17 | |
| 6-chloro-1-hydroxy-5-methylbenzotriazole (ethanol/water) | c | 215 | $C_7H_6ClN_3O$ (183.6) Calc. C 45.78, H 3.30, N 22.89; Found. 45.7, 3.3, 23.0 |
| (37 %) | | | |
| 6-chloro-1-hydroxy-5-isopropyl-benzotriazole (ethanol/water) | c | 173–4 | $C_9H_{10}ClN_3O$ (211.7) Calc. C 51.05, H 4.76, N 19.87; Found. 50.8, 4.7, 20.2 |

We claim:

1. In the method of synthesizing a peptide which comprises reacting: (A) a first reagent which is (1) an α-amino acid, in its D- or L-form, found in naturally-occurring peptides, (2) β-alanine, or (3) a peptide built up from these amino acids, said first reagent having a free carboxy group, all other functional groups thereof which require protection being protected; with (B) a second reagent which is (1) an α-amino acid, in its D -or L-form, found in naturally-occurring peptides, (2) β-alanine, or (3) a peptide built up from these amino acids, said second reagent having a free amino group, all other functional groups thereof which require protection being protected; in the presence of (C) a third reagent which is dicyclohexylcarbodiimide, diisopropylcarbodiimide, or a water-soluble carbodiimide; in an organic solvent at a temperature from −20°C. to 40°C., the improvement wherein said reagents are reacted in substantially equivalent amounts in the presence of one to two equivalents of (D) a 1-hydroxy-benzotriazole of the formula

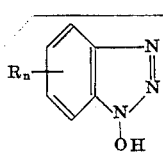

wherein R is at least one member selected from the group consisting of halogen, trifluoromethyl, nitro, sulfamoyl, carbamoyl, cyano, lower alkyl, methoxy, and ethoxy, and n is 0 or an integer from 1 to 4.

2. A method as in claim 1 wherein said carbodiimide is di-cyclohexylcarbodiimide.

3. The method of synthesizing a peptide which comprises reacting one equivalent part of (A) a first reagent which is (1) an α-amino acid, in its D- or L-form, found in naturally-occurring peptides, (2) β-alanine, or (3) a peptide built up from these amino acids, said first reagent having a free carboxy group, all other functional groups thereof which require protection being protected; with one equivalent part of (B) dicyclohexyl-carbodiimide, diisopropylcarbodiimide, or a water-soluble carbodiimide; and one to two equivalent parts of (C) a 1-hydroxy-benzotriazole of the formula

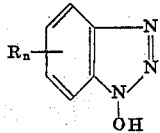

wherein R is at least one member selected from the group consisting of halogen, trifluoromethyl, nitro, sulfamoyl, carbamoyl, cyano, lower alkyl, methoxy, and ethoxy, and n is 0 or an integer from 1 to 4; in an organic solvent at −20°C. to 40°C. to form an ester of said 1-hydroxy-benzotriazole as a reactive-intermediate, and then further reacting said reactive intermediate, in an organic solvent at a temperature from −20°C. to 40°C. with one equivalent part of a further reagent (D) which is (1) an α-amino acid, in its D- or L-form, found in naturally-occurring peptides, (2) β-alanine, or (3) a peptide built up from these amino acids, said further reagent having a free amino group, all other functional groups thereof which require protection being protected.

4. A method as in claim 3 wherein said carbodiimide is dicyclohexylcarbodiimide.

5. A method as in claim 3 wherein said reactive intermediate is isolated prior to reaction with said further reagent (D).

* * * * *